Figure 1:
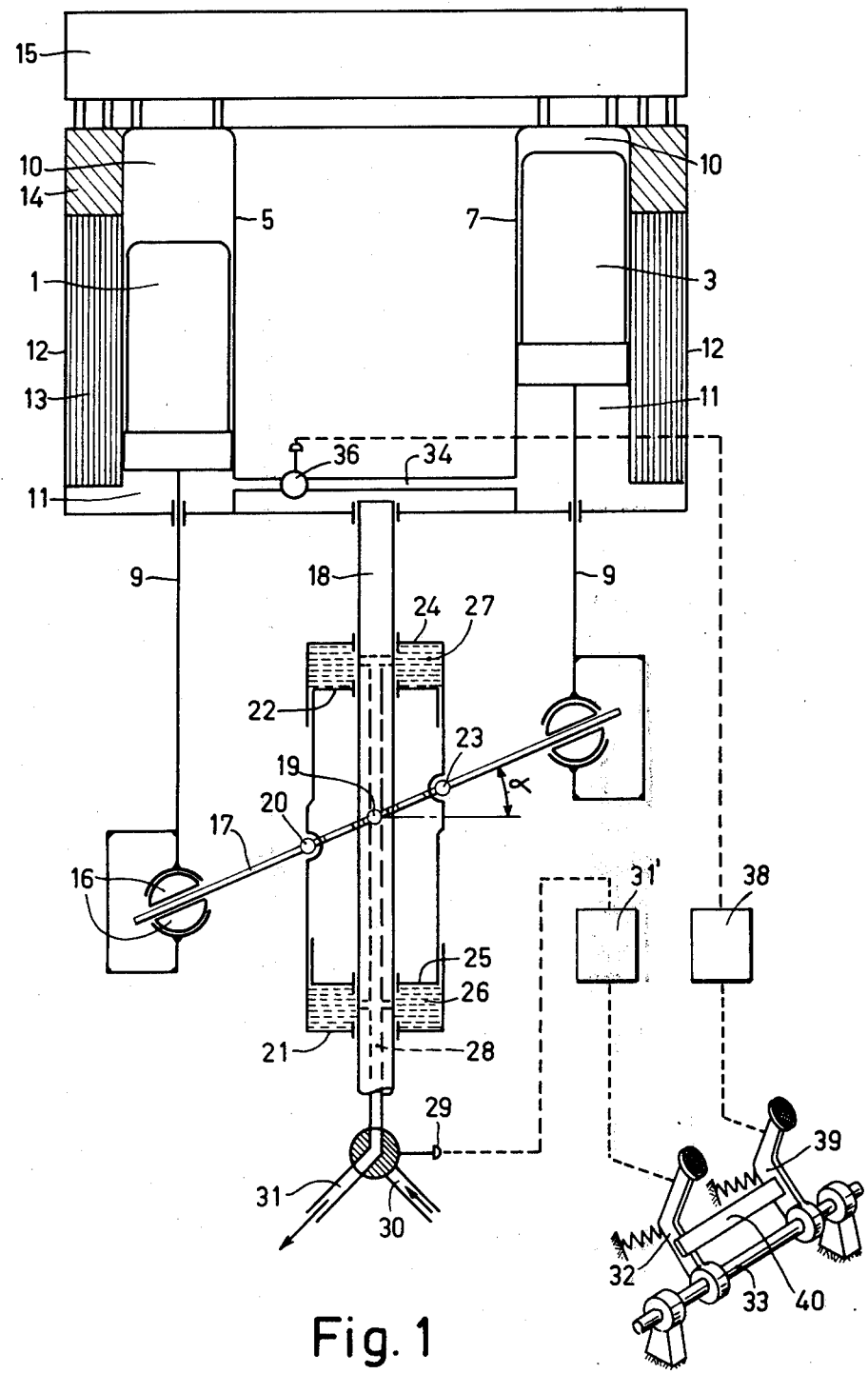

United States Patent [19]

Meijer

[11] 4,019,322
[45] Apr. 26, 1977

[54] HOT-GAS RECIPROCATING ENGINE

[75] Inventor: Roelf Jan Meijer, Eindhoven, Netherlands

[73] Assignee: U.S. Philips Corporation, New York, N.Y.

[22] Filed: Oct. 30, 1975

[21] Appl. No.: 627,107

[30] Foreign Application Priority Data

Jan. 22, 1975  Netherlands .................... 7500731

[52] U.S. Cl. .................................. 60/525; 60/526
[51] Int. Cl.² ......................................... F02G 1/06
[58] Field of Search ...................... 60/517, 522, 525

[56] References Cited
UNITED STATES PATENTS 3,538,706  11/1970  Toepel .................................. 60/525

Primary Examiner—Allen M. Ostrager
Attorney, Agent, or Firm—Frank R. Trifari

[57] ABSTRACT

A hot-gas reciprocating engine comprising at least three piston-like bodies which each separate a hot space and a cold space in the relevant cylinder. Each of the hot spaces communicates, via a regenerator, with one of the cold spaces in another cylinder. Each of the piston-like bodies cooperates, by way of a drive rod, with a plate which is mounted on a rotatable shaft in such a manner that it cannot rotate with respect to this shaft, but can be tilted about a tilting shaft extending transversely of the first-mentioned shaft. Each of the cold spaces communicates, by way of a duct incorporating a control valve, with a cold space in another cylinder. Means for operating these valves are so constructed that, when the valves are opened, these means operate the means for tilting the plate, so that the plate assumes a more inclined position with respect to the shaft. The means for tilting the plate can be operated independently of the means for operating the valves.

1 Claim, 2 Drawing Figures

HOT-GAS RECIPROCATING ENGINE

The invention relates to a hot-gas reciprocating engine comprising at least three piston-like bodies which are each movable in an associated cylinder and which each separate a hot and a cold space in the relevant cylinder, each of the hot spaces communicating, via a regenerator, with one of the cold spaces in another cylinder, each of the piston-like bodies furthermore being provided with a drive rod which co-operates, by way of a sliding body, with a plate which is mounted on a rotatably journalled shaft in such a manner that this plate cannot rotate with respect to the shaft but can be tilted about a tilting shaft extending transversely of the first-mentioned shaft, and means being provided for tilting the plate.

A hot-gas engine of the kind set forth is known from U.S. Pat. No. 3,511,102.

In this known hot-gas engine, a stroke variation of the pistons cooperating with the plate is achieved by tilting the plate about the tilting shaft. This results in a variation of the power delivered, so that the engine is controlled in this way.

The said tilting shaft may be a real shaft, but the plate may also be tilted about an imaginary axis.

In this known engine, however, engine braking is not possible, because this engine cannot deliver a negative torque. When a hot-gas engine is used for the traction of vehicles, engine braking must be possible. The heat released is then discharged to the ambient atmosphere via the radiator.

In hot-gas engines in which the power is controlled by the supply and discharge of working medium to and from the working space, it is known to brake the engine by so-called "by-pass control". The principle thereof is described in Netherlands Pat. Specification No. 10 1483. According to this system, the working spaces are made to communicate with each other via a narrow opening. A negative torque, and hence braking, can be achieved by way of the phase shift between pressure variations and volume variations caused by the narrow opening.

In an engine of the kind set forth, by-pass control cannot be incorporated simply, because when the plate is in a position perpendicular to the shaft, the compression ratio is very small, so that substantially no flow occurs through the narrow opening.

The invention has for its object to provide a hot-gas engine of the kind set forth in which engine braking is possible.

To this end, the hot-gas engine according to the invention is characterized in that each of the cold spaces communicates, via a duct incorporating a controllable valve, with a cold space on an other cylinder, means for operating these valves being provided which are so constructed that, when the valves are opened, these means also operate the means for tilting the plate, so that the plate assumes a more inclined position with respect to the shaft, whilst the means for tilting the plate can be operated independently of the means for operating the valves.

It is thus achieved that, when the by-pass valves are opened, the plate is at the same time tilted to a more inclined position, with the result that the compression ratio increases. Consequently, there will always be a substantial flow through the valves, thus giving rise to a substantial phase shift between volume variations and pressure variations, and hence to a large negative, and therefore braking, torque.

The invention will be described in detail hereinafter with reference to the accompanying diagrammatic drawings.

Figure 2:
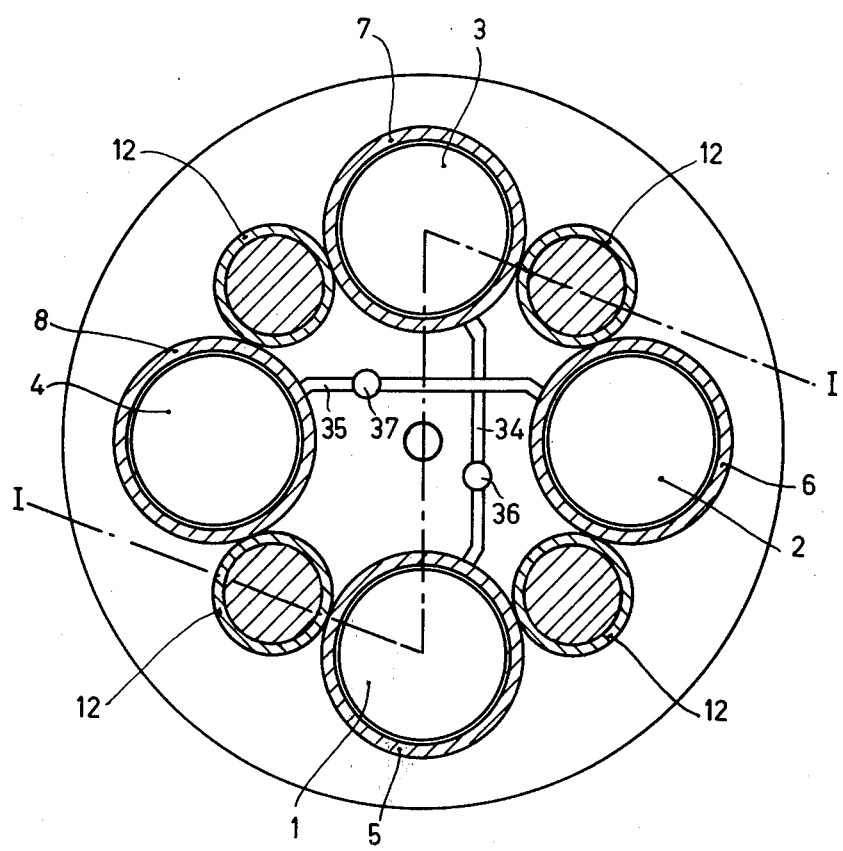

FIGS. 1 and 2 are two diagrammatic sectional views of a hot-gas engine.

This hot-gas engine comprises four double-acting pistons 1, 2, 3 and 4 which are accommodated in four cylinders 5, 6, 7 and 8. Each of the pistons 1, 2, 3 and 4 is provided with a drive rod 9 which is coupled to a drive system through the closed lower ends of the cylinders in a sealed manner.

In each cylinder, the pistons 1, 2, 3 and 4 respectively separate a hot space 10 from a cold space 11. Between the cylinders 5, 6, 7 and 8 there are arranged a corresponding number of units 12 which each comprise a cooler 13 and a regenerator 14.

On the cooler side, the units 12 are connected to one of the cold spaces 11, whilst on the regenerator side each of the units 12 has connected thereto a plurality of heater pipes which connect, via a heater 15, each of the units 12 to a hot space 10 in another cylinder.

A four-cylinder double-acting hot-gas engine is thus obtained whose principle is described in Netherlands Patent Specification No. 65813.

Each of the pistons 1 is provided with a drive rod 9 which cooperates with a plate 17 by way of sliding bodies 16.

The plate 17 is connected to a shaft 18 in such a manner that it cannot rotate with respect to this shaft 18 but can be tilted about a tilting shaft 19.

In order to tilt the plate 17 about the tilting shaft, the plate is pivotably connected to a pair of pistons 21 and 22 at the area 20 on one side of the tilting shaft and to a pair of pistons 24 and 25 at the area 23 on the other side of the tilting shaft.

The pistons 21 and 25, situated on one side of the plate 17, bound a space 26, whilst the pistons 22 and 24 which are situated on the other side of the plate 17 bound a space 27.

The spaces 26 and 27 can be connected as desired, via a duct 28 and a control device 29, to a liquid discharge duct 31.

The control device 29 is coupled, via an electrical control circuit 31' (not shown in detail), to a pedal which is pivotable about shaft 33. It will be understood that the pedal 32 may have a variety of forms in practice and that instead of a electrical coupling between this pedal and the control device 29, an hydraulic, pneumatic or normal mechanical coupling can alternatively be used.

By adjustment of the pedal 32, more or less liquid can thus be supplied to the spaces 26 and 27. As a result, the distance between the pistons 21 and 25 and 22 and 24 is varied, thus varying the inclined position of the plate 17. This results in a variation of the stroke length of the pistons 1, 2, 3 and 4, and hence in a variation of the power delivered by the engine.

In order to allow engine braking, i.e. in order to allow a negative torque to be obtained, the cylinders 5 and 7 and the cylinders 6 and 8 are connected to each other by the connection ducts 34 and 35, respectively, each of which incorporates a controllable valve 36 and 37, respectively. The valves 36 and 37 are connected, via a control circuit 38, to a pedal 39 which is also pivotable about the shaft 33.

Using the pedal 39, the valves 36 and 37 can be simultaneously opened to a variable degree. As a result, working medium will flow through the ducts 34 and 35, so that the phase between the pressure variations and volume variations of the working medium starts to change in such a manner that a negative torque is obtained.

The value of this negative torque is substantially dependent, however, of the compression ratio in the working space.

In order to ensure that an adequate braking torque is obtained in all situations, pedal 39 is provided with a rod 40 which extends across the pedal 32 so that, when the pedal 39 is pushed down, pedal 32 is always moved down with it. This means that when braking takes place (pedal 39 pushed down), pedal 32 also is depressed so that more liquid is supplied to the spaces 26 and 27 and the plate 17 starts to assume a more inclined position, thus producing a larger stroke of the pistons 1, 2, 3 and 4, and hence a larger compression ratio and more flow through the by-pass ducts 34 and 35, and hence a large negative torque.

Even though the pedals 32 and 39 are shown to be coupled by a rod 42 in the drawing, it will be understood that many other structural solutions are available which all satisfy the requirement that, when the by-pass valves 36 and 37 are opened, the valve 29 is also operated in a sense such that more liquid is supplied to the spaces 26 and 27, whilst when the pedal 32 alone is operated, the pedal 39 is not operated with it.

What is claimed is:

1. A hot-gas reciprocating engine comprising at least three piston-like bodies which are each movable in an associated cylinder and which each separate a hot and a cold space in the relevant cylinder, each of the hot spaces communicating, via a regenerator, with one of the cold spaces in an other cylinder, each of the pistion-like bodies furthermore being provided with a drive rod which cooperates, by way of a sliding body, with a plate which is mounted on a rotatable shaft in such a manner that this plate cannot rotate with respect to the shaft but can be tilted about a tilting shaft extending transversely of the first-mentioned shaft, and means being provided for tilting the plate, characterized in that each of the cold spaces communicates, via a duct incorporating a controllable valve, with a cold space in an other cylinder, means for operating these valves being provided which are so constructed that, when the valves are opened, these means also operate the means for tilting the plate, so that the plate assumes a more inclined position with respect to the shaft, whilst the means for tilting the plate can be operated independently of the means for operating the valves.

* * * * *